Feb. 4, 1930.  J. D. DUBY ET AL  1,745,610
TROLLEY HARP
Filed Jan. 28, 1928
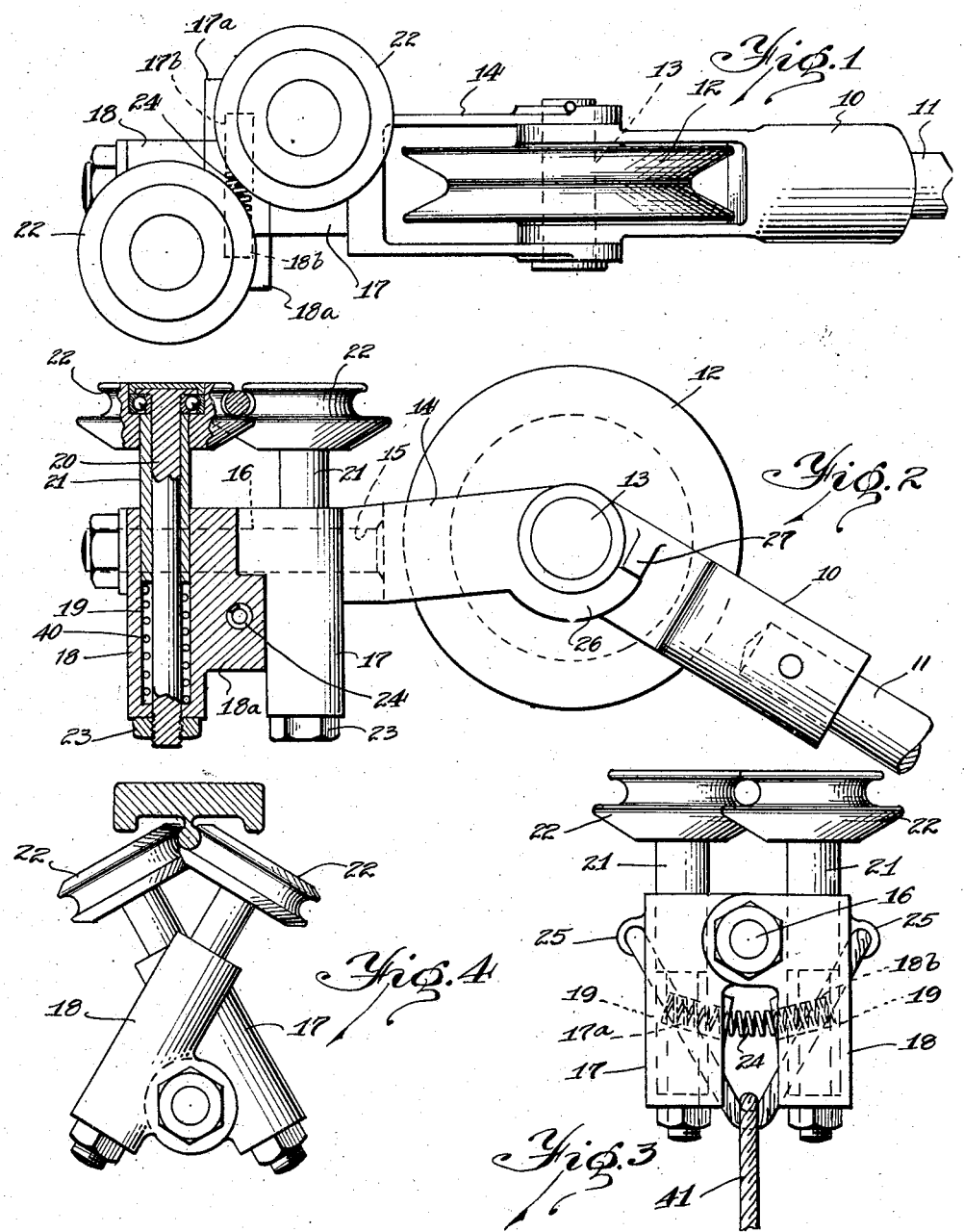
INVENTORS
John D. Duby,
George W. Keilholz
BY
Gilbert F. Hauke
ATTORNEY.

Patented Feb. 4, 1930

1,745,610

UNITED STATES PATENT OFFICE

JOHN D. DUBY AND GEORGE W. KEILHOLZ, OF DETROIT, MICHIGAN; SAID DUBY ASSIGNOR TO SAID KEILHOLZ

TROLLEY HARP

Application filed January 28, 1928. Serial No. 250,098.

This invention relates to trolley harps and more particularly to multiple wheel trolley harps which have been found to be especially suited for fast express trolley service.

Difficulty has always been experienced in maintaining efficient trolley service with rapid schedules because the trolleys will jump the wire and often break the overhead wires. Arcing has resulted from such high speed because of the excessive vibration set up. This arcing will in time crystallize the trolley wire and cause a break. The use of auxiliary gripping wheels, horizontally disposed with respect to the trolley wheel have been utilized to maintain the trolley wheel in constant contact with the trolley wire in order to overcome the difficulties mentioned above. However, this construction has not proven entirely satisfactory because they impose a severe strain on the trolley wire and tend to snap the wire, especially in cold weather when the wire is chilled and is more or less brittle.

It is the object of our invention to eliminate the difficulties mentioned above that are encountered with trolley harps of this character by constructing a trolley harp that may ride the trolley wire without stressing or straining the same.

Another object of our invention is to construct a trolley harp of the multiple wheel type which will render the maximum of service and which will prolong the life of the trolley wire with the consequent increase in service efficiency.

A further object of our invention is to provide a trolley harp of simple construction which may be economically manufactured and readily incorporated with the standard type of trolley pole.

These and other objects of our invention will be more apparent as the description progresses in which like characters refer to like parts in the accompanying drawing which illustrates a preferred embodiment of our invention.

Fig. 1 is a plan view of a trolley harp constructed in accordance with our invention.

Fig. 2 is a side elevation of the same, partly in section.

Fig. 3 is a front elevational view thereof.

Fig. 4 is an elevational view of a modified form of construction.

A trolley harp of the multiple wheel type consists of a grooved wheel positioned vertically and one or more grooved wheels disposed at an angle therewith and adapted to grip the side of the trolley wire to maintain the vertical wheel in constant contact with the trolley wire. A bracket 10 is pinned or otherwise secured to a trolley pole 11, which may be swivelly supported in the usual manner to the roof of the car (not shown). A grooved trolley wheel 12 is rotatably supported on the shaft 13 carried by this bracket 10. A bracket 14 is rotatably supported on the shaft 13, the rear portion of said bracket provided with a tapped hole 15 in which is secured the stud 16. Preferably a pair of wheel supports 17 and 18 are rotatably supported on this stud 16, each support being drilled out to provide a cylindrical recess 19. The recesses 19 are disposed off center of the stud as plainly shown in Figs. 1 and 3. A bolt 20 is threaded through each of the recesses 19, and a sleeve 21 is fitted over each bolt. A trolley wheel 22 is secured to the upper end of each bolt, a suitable ball bearing being provided to permit the trolley wheels to rotate freely. Each sleeve 21 is shorter than the bolt to which it is assembled and a coil spring 40 is coiled about each bolt and bears against the lower end of each sleeve and against the bottom of each recess, thus exerting an upward pressure on the bolt, the nuts 23 secured to the lower ends of the bolts being arranged to engage the bottom face of the wheel support to limit such upward movement.

The wheel supports are each provided with the lugs or ears 17$^a$ and 18$^a$ which overlap, these ears being each provided with a spring recess 17$^b$ and 18$^b$. A compression spring 24 is seated in these spring recesses and exerts a force tending to spread the lower legs of the wheel support and force the upper portions together. Referring to Fig. 3 it will plainly be seen how the spring 24 forces the trolley wheels 22 together so as to grip the trolley wire and thus prevent the trolley wheel 12 from jumping off the trolley wire.

The wheel supports are each provided with an outwardly and laterally projecting eyelet 25 to which a cable or rope 41 may be fastened so that the trolley wheels 22 may be spread apart by pulling on the rope.

It will be observed that the bracket 14 may rotate on the shaft 13, but the movement of this bracket is limited. The bracket is provided with an ear 26 which is arranged to engage a stop 27 carried by the bracket 10 to limit its movement in a counter clockwise direction with respect to the trolley pole. However, as the pole is forced down because of the lower altitude of the trolley wire the bracket is free to rotate in a clockwise direction with respect to the trolley pole. Thus the horizontally positioned trolley wheels are permitted to follow the trolley wire without straining or stressing the wire; in other words, they will align themselves with the other trolley wheel.

Fig. 4 illustrates a modified form of construction in which the wheel supports 17 and 18 are positioned at an angle to each other in order that the wheels may more readily pass under a frog or other obstruction.

We claim:

1. A trolley harp comprising a wheel support adapted for attachment to a trolley pole, a grooved trolley wheel supported thereby and disposed in a plane perpendicular to the ground and adapted to engage a trolley wire, an auxiliary wheel bracket pivotally secured to said wheel support, a plurality of trolley wheels yieldingly supported by said auxiliary wheel bracket and disposed in a plane horizontal to the ground, and yieldable means for maintaining said last mentioned wheels in gripping contact with the trolley wire extending therebetween.

2. A trolley harp comprising a wheel support adapted for attachment to a trolley pole, a grooved trolley wheel supported thereby and disposed in a plane perpendicular to the ground and adapted to engage a trolley wire, an auxiliary wheel bracket pivotally secured to said wheel support, and a plurality of trolley wheel supports pivotally supported on said auxiliary wheel bracket, a trolley wheel rotatably and yieldingly supported on each of said last mentioned wheel supports and disposed in a horizontal plane with respect to the ground, and yieldable means for maintaining said last mentioned wheels in gripping contact with the trolley wire extending therebetween.

3. A trolley harp comprising a wheel support adapted for attachment to a trolley pole, a grooved trolley wheel supported thereby and disposed in a plane perpendicular to the ground and adapted to engage a trolley wire, an auxiliary wheel bracket pivotally secured to said wheel support and having a stud secured thereto, a plurality of trolley wheel supports pivotally supported on said stud, a trolley wheel rotatably and yieldingly supported on each of said last mentioned trolley wheel supports and disposed in a horizontal plane with respect to the ground, and yieldable means for maintaining said last mentioned wheels in gripping contact with the trolley wire extending therebetween.

4. A trolley harp comprising a wheel support adapted for attachment to a trolley pole, a grooved trolley wheel supported thereby and disposed in a plane perpendicular to the ground and adapted to engage a trolley wire, an auxiliary wheel bracket pivotally secured to said first mentioned bracket and having a horizontally projecting stud secured thereto, a plurality of trolley wheel supports pivotally supported on said stud, said last mentioned trolley wheel supports extending above and below the axis of the stud, a trolley wheel rotatably secured to each of said last mentioned wheel supports above the axis of the stud and disposed in a plane at an angle to the axis of the support, and yieldable means for exerting a pressure tending to spread the extensions of the support below the axis of the stud for yieldably forcing the wheel carrying portions of the support together for maintaining the wheels carried thereby in gripping contact with the trolley wire extending therebetween.

5. A trolley harp, comprising a bracket adapted for pivotal attachment to a trolley pole, a pair of trolley wheel supports slidably supported thereby, said trolley wheel supports permitted to have vertical relative movement therewith, yielding means for exerting an upward force on said trolley wheel support, and means for limiting the upward movement thereof.

6. A trolley harp comprising a bracket adapted for pivotal attachment to a trolley pole, a pair of horizontally disposed trolley wheels, trolley wheel supports slidably supported by said bracket, and each permitted to have vertical relative movement therewith, a spring for exerting an upward force on each of said trolley wheel supports, and means for limiting the upward movement thereof.

7. A trolley harp, comprising a bracket adapted for pivotal attachment to a trolley pole, a pair of horizontally disposed trolley wheels, trolley wheel supports, each comprising a plunger portion slidably supported in said bracket, yielding means bearing on said plungers for exerting an upward force on said trolley wheel supports, and means for limiting the upward movement thereof.

8. A trolley harp, comprising a bracket adapted for pivotal attachment to a trolley pole and provided with a recess, a horizontally disposed trolley wheel adapted for engagement with the side of a trolley wire, a trolley wheel support for pivotally supporting said trolley wheel and which is arranged to be slidably supported in the recess carried by said bracket, means for limiting the relative movement of said trolley wheel support in one direction, and yieldable means for cushioning said support, and yieldingly resist a movement of the support in the opposite direction.

In testimony whereof we have affixed our signatures.

JOHN D. DUBY.
GEORGE WM. KEILHOLZ.